(12) United States Patent
Berger et al.

(10) Patent No.: US 7,778,398 B2
(45) Date of Patent: Aug. 17, 2010

(54) COMMUNICATION CENTER APPLICATION

(75) Inventors: Scott M. Berger, Atlanta, GA (US); Matt Heacock, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1231 days.

(21) Appl. No.: 11/095,392

(22) Filed: Mar. 31, 2005

(65) Prior Publication Data

US 2006/0126818 A1 Jun. 15, 2006

Related U.S. Application Data

(60) Provisional application No. 60/635,804, filed on Dec. 14, 2004.

(51) Int. Cl.
| H04M 11/00 | (2006.01) |
| H04M 15/00 | (2006.01) |
| G06F 17/00 | (2006.01) |
| G06F 17/20 | (2006.01) |
| G06F 17/28 | (2006.01) |

(52) U.S. Cl. .............................. 379/88.14; 379/121.05; 715/261; 704/1; 704/2

(58) Field of Classification Search . 379/265.01–266.1; 705/9, 26; 704/2; 707/540; 715/500, 518, 715/531

See application file for complete search history.

(56) References Cited

U.S. PATENT DOCUMENTS

| 5,517,405 | A | | 5/1996 | McAndrew |
| 6,279,018 | B1 | * | 8/2001 | Kudrolli et al. ............. 715/234 |
| 6,463,437 | B1 | | 10/2002 | Mongilio |
| 6,571,236 | B1 | | 5/2003 | Ruppelt |
| 6,581,067 | B1 | * | 6/2003 | Bjergo et al. ............. 707/104.1 |
| 6,658,106 | B1 | * | 12/2003 | Atkinson et al. ....... 379/265.11 |
| 6,697,481 | B2 | * | 2/2004 | Matsumoto ............ 379/265.09 |
| 6,707,904 | B1 | | 3/2004 | Judkins |
| 6,970,880 | B2 | * | 11/2005 | Camarillo .......................... 1/1 |
| 7,475,343 | B1 | * | 1/2009 | Mielenhausen ............. 715/261 |
| 2002/0123983 | A1 | | 9/2002 | Riley |
| 2003/0046308 | A1 | | 3/2003 | Weber |
| 2003/0056140 | A1 | | 3/2003 | Taylor |
| 2004/0054693 | A1 | | 3/2004 | Bhatnagar |
| 2004/0093263 | A1 | | 5/2004 | Doraisamy |
| 2005/0240391 | A1 | * | 10/2005 | Lekutai ......................... 704/2 |
| 2006/0039547 | A1 | * | 2/2006 | Klein et al. ............ 379/265.02 |

* cited by examiner

*Primary Examiner*—Curtis Kuntz
*Assistant Examiner*—Mohammad K Islam
(74) *Attorney, Agent, or Firm*—Scott P. Zimmerman, PLLC

(57) ABSTRACT

Methods, systems, and products are disclosed for creating a record with a customer. One method receives at a communication center a request for support from the customer. A data field is presented to an agent for entry of information identifying the customer. A menu of options is presented that allows the agent to make selections describing the customer's request for support. A preformatted note is populated with selections received from the agent. The preformatted note has fields corresponding to the menu of options, with the preformatted note formed by populating a particular field with the corresponding selection by the agent. The preformatted note is stored as the record of the customer's request for support, wherein the preformatted note has a standardized format regardless of the agent.

20 Claims, 10 Drawing Sheets

COMMUNICATION CENTER APPLICATION

CROSS-REFERENCE TO RELATED APPLICATIONS

This application claims benefit under 35 U.S.C. §119 (e) of U.S. Provisional Application No. 60/635,804, filed Dec. 14, 2004, which is incorporated herein by reference in its entirety.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND

This application generally relates to computer graphics processing, to data processing, and to electrical computers and digital processing systems. This application, more particularly, relates to arrangements for managing communications.

Many call centers use customer relationship management software. This customer relationship management (or "CRM") software allows the call center to manage and to track interactions with customers. These customers, for example, may call for technical support or to obtain information about a product or service information. When the customer contacts the call center, the customer interacts with a agent. The CRM software then creates a record of that interaction. The CRM software, in particular, creates a record that describes the disposition of the customer's request.

Conventional CRM software, however, is not adequately designed for today's needs. It can be years old and, thus, does not provide a flexible platform for today's call centers. Many business sectors are intensely competitive, and this inflexible CRM platform cannot adapt to the challenges of current business conditions. The communications sector, for example, is a very competitive and regulated business environment. Communications service is a very dynamic environment, and service providers constantly improve, change, and add features. The inflexible conventional CRM software, however, cannot reflect this dynamic environment. The conventional CRM software does not track all of the different types of issues that customers call to report, and it is not flexible to permit hour-by-hour or day-by-day analysis of customer issues.

Regulatory guidelines create another concern. If a communications service provider makes a commitment to follow-up with a customer, regulatory agencies often impose guidelines in meeting that commitment. The conventional CRM software, however, is not adequate for meeting these strict regulatory guidelines. Conventional CRM software does not track these commitments to ensure the guidelines are satisfied. Because the conventional CRM software does not provide a mechanism to track these commitments, communications service providers are unable to adequately audit their commitments to customers.

Real-time reporting is another deficiency. The call center may receive hundreds, even thousands, of calls on an hourly or daily basis. As customers call the call center, management needs real-time data that describes these calls. Management needs data that describes the real-time volume of calls, the various dispositions of these calls, and even the number of commitments to return the customer's call.

What is needed, then, is a communication center software application that reflects current business conditions. This communication center application should create a record that describes the disposition of the customer's request. The communication center application should be flexible to track all issues of importance to the call center's management. The communication center application should permit hour-by-hour or day-by-day analysis to improve customer satisfaction benchmarks. The communication center application should track customer commitments to ensure regulatory guidelines are satisfied. The communication center application should also permit real-time reporting and analysis of data.

SUMMARY

The aforementioned problems, and other problems, are reduced, according to the exemplary embodiments, by a communication center application. This communication center application is a flexible customer relationship management tool that is adaptable to dynamic business conditions. This communication center application comprises methods, computer systems, and computer products that provide a web-based customer relationship management tool. The communication center application creates a record of how an agent disposes of a customer's inquiry to the communication center. The agent can easily log-in to a website, select a web link, and launch the communication center application. When the agent receives the customer's inquiry, the agent enters a customer's telephone number or other information that identifies the customer. The communication center application then quickly retrieves account information concerning that customer. The agent may thus quickly resolve the customer's concerns without entering redundant information. If no account information exists for that customer, the communication center application includes a simple graphical user interface that quickly allows the agent to enter the customer's account information. The agent may then disposition the customer's call using selectable codes for any number of options.

The exemplary embodiments also track commitments. As the agent disposes of the customer's inquiry, the agent may need to schedule a follow-up. Sometimes the customer wants a return phone call, email, or other communication after reporting a problem. Sometimes the communication center has a policy of following-up on certain problems or certain customers. Whatever the reasons, the exemplary embodiments manage these commitments. When the agent makes a commitment to follow-up with the customer, the communication center application allows the agent to schedule that follow-up. The communication center application will then automatically queue that follow-up to ensure the scheduled commitment is performed. The communication center application even stores and presents the reason(s) why the follow-up was necessary.

The exemplary embodiments also include reporting features. The communication center application can create reports describing what problems customers are reporting and what resolutions are recommended. The exemplary embodiments, in other words, can help administrators and managers determine what is driving the volume of customer inquiries. The communication center application tabulates problem codes, resolution codes, or any other information or selection that helps the administrators/managers track problems. The communication center application may even calculate the percentage of inquiries having a particular code. The exemplary embodiments also include filtering and sorting options. These filtering/sorting options allow data to be presented in any way that aids administrators and/or managers. The communication center application can also filter these statistics according to ranges of times and/or dates, or the data can be filtered/sorted according to vendors, regions, and many other criteria.

The exemplary embodiments may also be configured for real-time reporting. The communication center application includes a configurable refresh rate. This refresh rate automatically refreshes any reports to reflect the most recent inquiries. The refresh rate, for example, may occur every thirty (30) seconds, thus creating real-time statistics of current conditions. A manager may keep a reports webpage open and running on a computer, and the manager receives accurate statistics in thirty second intervals. Whatever the actual value of the refresh rate, the administrator/manager quickly sees spikes and volumes for different problem and/or resolution codes. This real-time reporting feature may quickly indicate an e-mail problem, service outage, or some other problem that drives customer inquiries.

According to the exemplary embodiments, methods, systems, and products are disclosed for creating a record of a disposition. One of the embodiments describes a method that receives at a communication center a request for support from a customer. A data field is presented to an agent for entry of information identifying the customer. A menu of options is presented that allows the agent to make selections describing the customer's request for support. A preformatted note is populated with the selections received from the agent. The preformatted note has fields corresponding to the menu of options, with the preformatted note formed by populating a particular field with the corresponding selection by the agent. The preformatted note is stored as the record of the customer's request for support, wherein the preformatted note has a standardized format regardless of the agent.

Other embodiments describe a system for creating a record of a disposition. The system has a communication center software application stored in a memory device and a processor communicates with the memory device. The communication center software application presents a data field for entry of information identifying a customer making a request for support to a communication center. The communication center software application also presents a menu of options to an agent. The menu of options allows the agent to make selections describing the customer's request for support. The communication center software application populates a preformatted note with the selections received from the agent. The preformatted note has fields corresponding to the menu of options, with the preformatted note formed by populating a particular field with a corresponding selection by the agent. The communication center software application stores the preformatted note as the record of the customer's request for support. The preformatted note thus has a standardized format regardless of the agent.

Still more embodiments describe a computer program product for creating a record of a call disposition. The computer program product is a computer-readable medium and a communication center software application stored on the computer-readable medium. The communication center software application comprises computer-readable instructions for presenting a data field for entry of information identifying a customer making a request for support to a communication center. The instructions present a menu of options to an agent, with the menu of options allowing the agent to make selections describing the customer's request for support. The instructions populate a preformatted note with the selections received from the agent. The preformatted note has fields corresponding to the menu of options, with the preformatted note formed by populating a particular field with a corresponding selection by the agent. The instructions store the preformatted note as the record of the customer's request for support, wherein the preformatted note has a standardized format regardless of the agent.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DESCRIPTION OF THE DRAWINGS

These and other features, aspects, and advantages of the embodiments are better understood when the following Detailed Description is read with reference to the accompanying drawings, wherein.

DETAILED DESCRIPTION

Figure 1:
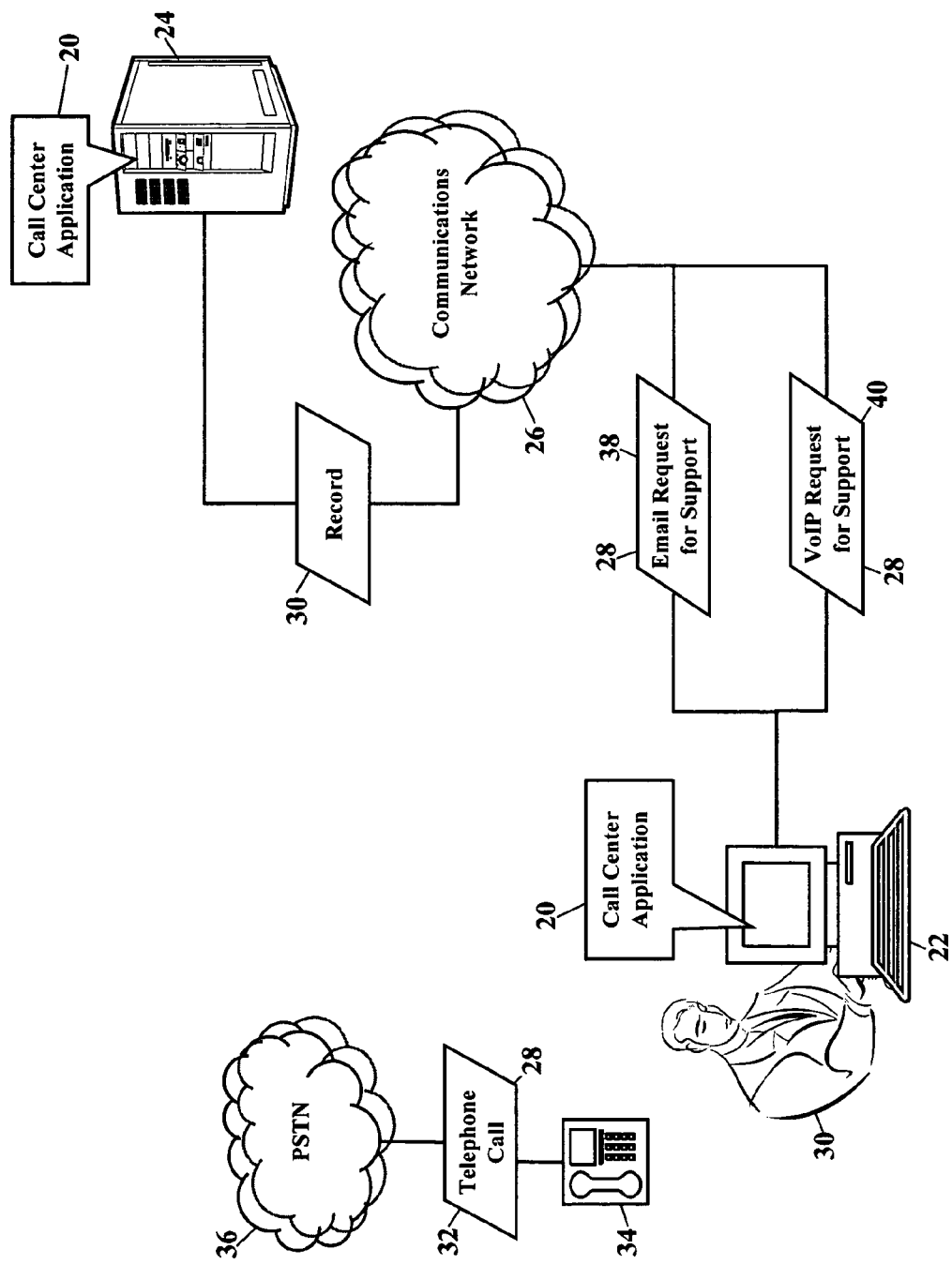
FIGS. 1 and 2 are simplified schematics illustrating a communication center application implementation according to exemplary embodiments.

Exemplary embodiments will now be described more fully hereinafter with reference to the accompanying drawings, in which exemplary embodiments are shown. The exemplary embodiments, however, may be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

The exemplary embodiments describe a communication center application. In the description that follows, a call center application is described. However, it should be appreciated that the invention is not limited to call center applications but is applicable to any type of communication center application.

According to an exemplary embodiment, a communication center application is a flexible customer relationship management tool that is adaptable to dynamic business conditions. This communication center application comprises methods, computer systems, and computer products that provide a web-based customer relationship management tool. The communication center application creates a record of how an agent disposes of a customer's inquiry to the communication center. The agent can easily log-in to a website, select a web link, and launch the communication center application. When the agent receives the customer's inquiry, the agent enters a customer's telephone number or other information that identifies the customer. The communication center application then quickly retrieves account information concerning that customer. The agent may thus quickly resolve the customer's concerns without entering redundant information. If no account information exists for that customer, the communication center application includes a simple graphical user interface that quickly allows the agent to enter the customer's account information. The agent may then disposition the customer's inquiry using selectable codes for any number of options.

Figure 2:
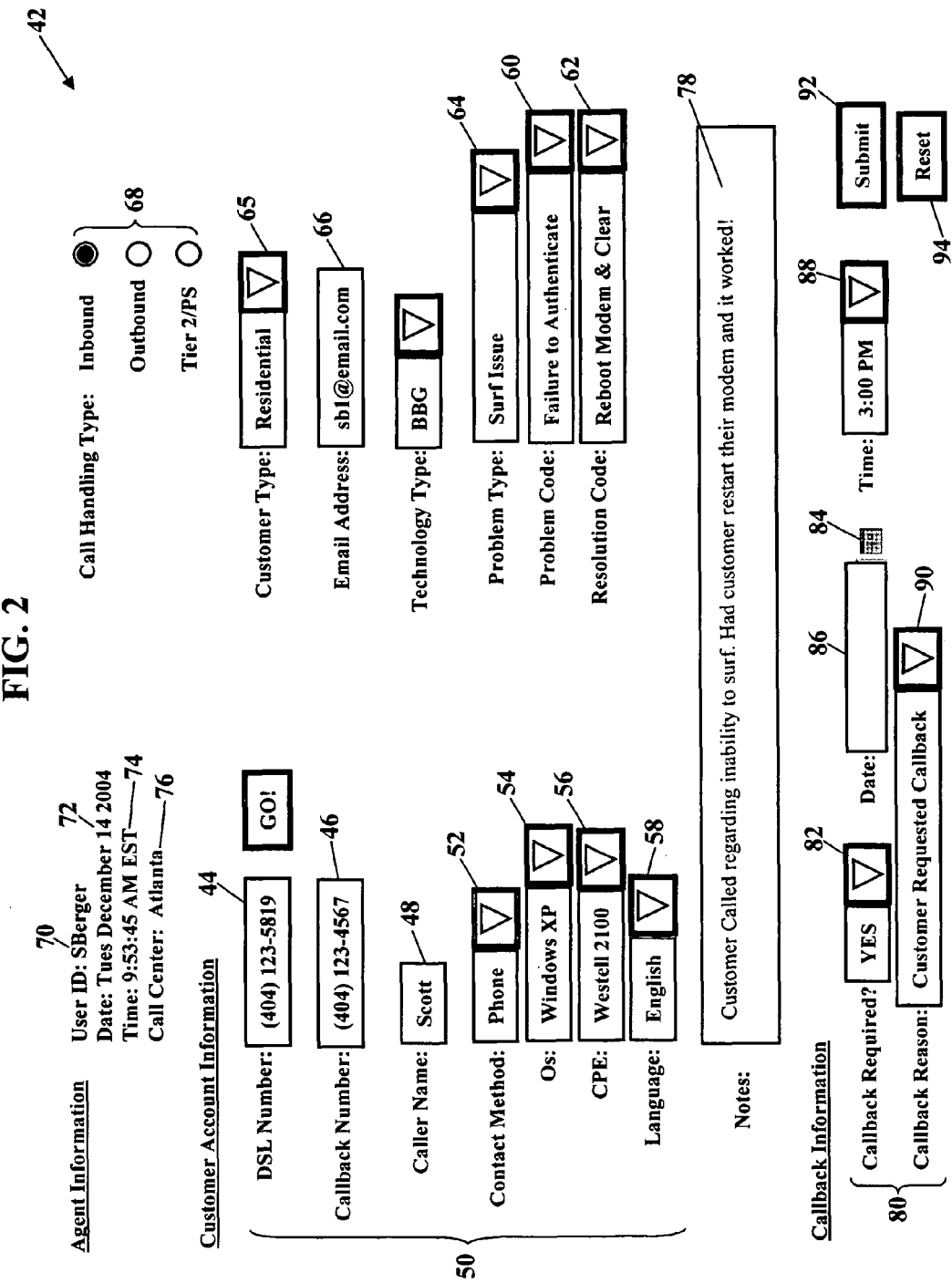

FIGS. 1 and 2 are simplified schematics illustrating exemplary embodiments. The embodiments include a communication center application 20. The communication center application 20 comprises methods, systems, computer programs, and/or computer program products that create a record of a customer's interaction with a communication center. The communication center application 20 operates within any computer system, such as a client computer 22. Some or all of the communication center application 20 may additionally or alternatively operate within a computer server 24. The client computer 22 and the computer server 24 communicate with one another via a communications network 26. The communications network 26 may be a cable network operating in the radio-frequency domain and/or the Internet Protocol (IP) domain. The communications network 26, however, may also include a distributed computing network, such as the Internet (sometimes alternatively known as the "World Wide Web"), an intranet, a local-area network (LAN), and/or a wide-area network (WAN). The communications network 26 may include coaxial cables, copper wires, fiber optic lines, and/or hybrid-coaxial lines. The communications network 26 may even include wireless portions utilizing any portion of the electromagnetic spectrum and any signaling standard (such as the I.E.E.E. 802 family of standards, GSM/CDMA/TDMA or any cellular standard, and/or the ISM band).

As FIG. 1 illustrates, a request 28 for support is received. An agent 30, using the client computer 22, receives the request 28 for support from the customer. The communication center application 20 creates a record 30 of the transaction between the agent 30 and the customer. The request 28 for support from the customer may be a wireline/wireless telephone call, an electronic inquiry (such as an email communication, instant message communication, or page communication), or even an in-person, verbal inquiry. FIG. 1, for example, shows the agent 30 receiving a telephone call 32 at a wireline/wireless telephone 34. The telephone call 32 is received via the Public Switched Telephone Network (PSTN) 36. The agent 30, however, may additionally or alternatively receive an email communication 38 from the customer via the communications network 26. The request 28 for support from the customer may even be a Voice Over Internet Protocol (VoIP) telephone call 40 received via the communications network 26. However the request 28 for support from the customer is received, the agent 30 interacts with the customer and documents that interaction.

FIG. 2 is a schematic illustrating a graphical user interface 42, according to the exemplary embodiments. When the agent (shown as reference numeral 30 in FIG. 1) interacts with the customer, the graphical user interface 42 helps the agent document that interaction. The agent launches the communication center application (shown as reference numeral 20 in FIG. 1) using any of a variety of known techniques. The communication center application visually presents or produces the graphical user interface 42 at the client computer (shown as reference numeral 22 in FIG. 1). The graphical user interface 42 has various open data fields and options that help the agent disposition the customer's request for support (shown as reference numeral 28 in FIG. 1). FIG. 2, for example, illustrates a DSL number data field 44 and a callback number data field 46. When the customer makes the request for support, the customer may need help or assistance with a digital subscriber line. The DSL number data field 44 allows the agent to enter information that identifies the customer. Although any information can identify the customer (such as an account number, an address, a social security number, or a name), the agent enters a telephone number associated with the digital subscriber line. The agent also enters, in the callback number data field 46, a telephone number at which the customer may be phoned. The customer may prefer contact via an electronic communication, so the agent could alternatively or additionally enter an alternate communications address. The agent may even enter a name into a customer name data field 48.

The graphical user interface 42 also includes a menu 50 of options. The menu 50 of options allows the agent to make selections describing the customer's request for support (shown, respectively, as reference numerals 30 and 28 in FIG. 1). The menu 50 of options includes various "drop-down" menus for selecting information that describes the customer's request for support. As FIG. 2 illustrates, the menu 50 of options includes menus for a contact method 52, for an operating system 54, for the customer's premise equipment 56, and for the customer's preferred language 58. The contact method 52 provides selections describing how the customer would prefer to be contacted for a follow-up. The operating system 54 provides selections that describe an operating system used by the customer's computer. The customer premise equipment menu 56 provides selections that describe any communications equipment used by the customer. The communications equipment may include modem, computer manufacturer and/or model, processor manufacturer and model, motherboard manufacturer and model, router manufacturer and model, premise wiring (CAT 3, 5, 7 and/or fiber), phone/pager/PDA manufacturer and model, software vendor and version, and any other equipment. The language menu 58 presents selections for choosing the customer's language preferences, such as Spanish, English, French, or any other language or dialect.

The graphical user interface 42 also includes a problem code menu 60 and a resolution code menu 62. As the agent (shown as reference numeral 30 in FIG. 1) interacts with the customer, the agent learns what type of problem the customer is experiencing. The agent then makes a selection from a problem type menu 64. The problem type menu 64 presents selections that best categorize the customer's problem. Once the problem is categorized, the agent then selects a problem code from the problem code menu 60. The problem code menu 60 presents selections that further refine, categorize, and/or describe the customer's problem or issue. Once the agent narrows down the customer's problem, the agent attempts to resolve the customer's concern. The agent is specially trained to recommend actions to resolve the problem. Once the agent makes one or more recommendations to resolve the problem, the agent then selects a resolution code from the resolution code menu 62. The resolution code menu 62 presents selections that describe how the customer's request for support was resolved. While the problem code menu 60 and the resolution code menu 62 can have any format, the list of resolution codes preferably corresponds to the list of problem codes. That is, the problem code and the resolution code are linked such that the selectable resolution codes are specific to the chosen problem code. Once the agent makes a selection from the problem code menu 60, the agent may then only select resolution codes that correspond to the problem code.

The graphical user interface 42 may also include other fields or menus that help identify the customer. The customer, for example, may be a residential customer, a small business customer, a corporate account, or some other classification. A customer type menu 65, then, presents selections that describe/classify the inquiring customer. An open email address data field 66 permits the agent to input a communications address associated with the customer. A call handling type 68 presents selections for noting whether the customer made an inbound inquiry, whether the agent made an outbound communication to the customer, or whether the inquiry was escalated to a level 2 technician.

The graphical user interface 42 may also include other information. The graphical user interface 42, for example, may present the agent's user identification 70 to indicate the agent is properly logged on and authenticated with the communication center application (shown as reference numeral 20 in FIG. 1). The graphical user interface 42 may also present the current date 72 and time 74 of receipt of the customer's request, and the graphical user interface 42 may present an identifier 76 of the call center location.

The graphical user interface 42 also includes an area 78 for personal notes. As the agent (shown as reference numeral 30 in FIG. 1) interacts with the customer, the agent identifies the customer, documents the customer's problem, and makes a recommendation to resolve the problem. The menu 50 of options allows the agent to make selections that describe this interaction. The agent, however, make also enter personal notes in the area 78. These personal notes are "free form" in that the agent may use language, shorthand, and acronyms that suit the agent.

The graphical user interface 42 may include a commitment region 80. This commitment region 80 allows the agent to schedule a callback follow-up with the customer. The graphical user interface 42, for example, may present a callback required menu 82. The callback required menu 82 presents a pull-down menu of options to follow-up with the customer's request for support. If the agent selects "YES" from the callback required menu 82, the communication center application 20 presents options to schedule a callback. As FIG. 2 shows, the graphical user interface 42 presents an icon 84 that resembles a calendar. If the agent clicks or otherwise selects the icon 84, a calendar appears to choose a date for the callback. The selected date for the callback is displayed in a date field 86. A drop-down menu 88 of available times allows the agent to schedule the time of the callback. The commitment region 80 also includes a menu 90 of reasons for scheduling the callback, thus allowing the callback to quickly progress to productive conversation.

The communication center application 20 may automatically schedule a callback. The communication center application may determine that certain selections automatically trigger a callback. Certain problem codes and/or resolution codes, for example, may require follow-up. When the agent selects a particular problem code, that problem code may require a callback. If the agent selects a resolution code that indicates the customer's problem was not resolved, a callback may be desired. The communication center application may also determine that certain classes of customers, or even certain customers, require a callback to enhance customer satisfaction. Whatever the reasons, the communication center application 20 may automatically schedule a callback.

When the customer's inquiry is complete, the agent submits the information to the communication center application 20. Once the agent completes the menu 50 of options, and schedules any callback commitment, the agent clicks or otherwise selects a "submit" icon 92. The agent may alternatively select a "reset" icon 94 that clears some, or all, selections.

Figure 3:
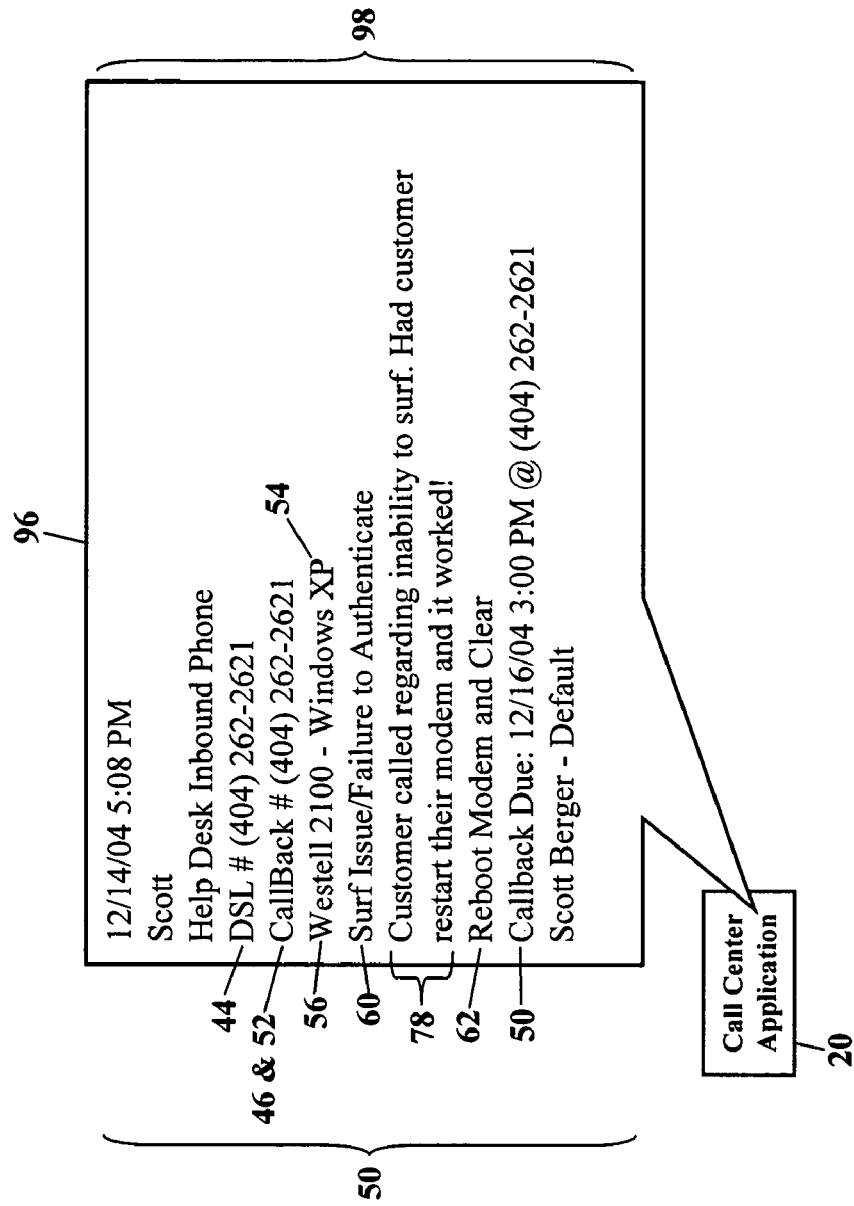
FIG. 3 is a schematic illustrating a preformatted note, according to more exemplary embodiments.

FIG. 3 is a schematic illustrating a preformatted note 96, according to more exemplary embodiments. The preformatted note 96 represents a disposition record of the customer's request for service. The preformatted note 96 incorporates one or more of the selections from the menu of options (shown as reference numeral 50 in FIG. 2). The preformatted note 96, however, has a standard format, regardless of the agent. That is, no matter what agent creates the record of the interaction, each record has a consistent structure, content, and look. Moreover, because each record conforms to a standardized format, as will be later explained, all the records can be efficiently searched, filtered, and/or sorted for management purposes.

The preformatted note 96 has one or more fields 98. Each field 98 corresponds to the menu of options (shown as reference numeral 50 in FIG. 2). The preformatted note 96 is formed by populating a particular field with a corresponding selection by the agent. That is, as the agent makes a selection in the menu of options, the communication center application 20 populates a corresponding field 98 with the selection received from the agent. The preformatted note 96, for example, has fields that correspond to the contact method 52, the operating system 54, the customer's premise equipment 56, and the customer's DSL number 44. The preformatted note 96 also includes the problem code 60, the resolution code 62, and any other selections from the menu of options. The preformatted note 96 is thus an accurate, but standardized, record of the interaction between the customer and the agent. As the agent makes selections in the menu of options, those selections may be extracted and inserted into the corresponding fields 98. The preformatted note 96 thus has a standardized format and content. Regardless of which agent entered the information, every interaction with a customer is completely described by a common format.

The preformatted note 96 may even include the agent's personal notes 78. Although each agent's personal notes may have diverse content and meaning, those notes are limited in character length to maintain a standardized format. If the agent enters a personal note that exceeds the permitted character length (such as 400 characters), the communication center application 20 may truncate the personal note to maintain the standardized format. The communication center application, for example, may truncate all text that exceeds the permitted character length. Perhaps a more innovative truncation scheme, however, is to periodically discard characters from the agent's personal notes. ASCII coding that represents word spaces would be maintained, however, to ensure contextual meaning. The communication center application, for example, may discard every fifth ($5^{th}$) character, unless that fifth character is a space between words. This scheme, then, would limit each word to no more than five (5) letters. Most words can be deciphered from the first five letters, so contextual meaning may not be compromised. However the communication center application truncates, or discards, portions of the personal note, the preformatted note 96 can incorporate those notes and still have a common, standardized format.

Figure 4:
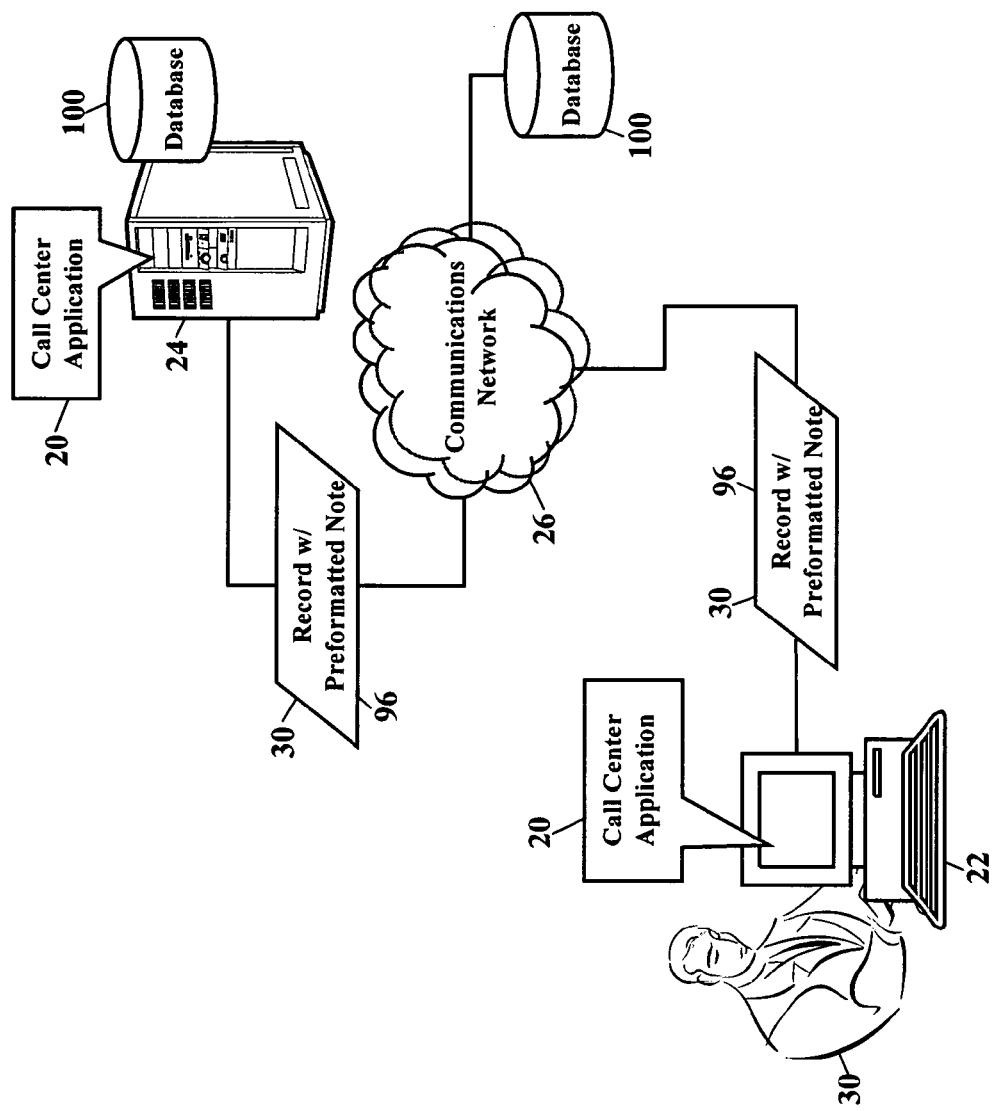
FIG. 4 is a schematic illustrating communication of a record, according to still more exemplary embodiments.

FIG. 4 is a schematic illustrating communication of the record 30, according to still more exemplary embodiments. The agent 30, as earlier explained, received the request for support from the customer (shown as reference numeral 28 in FIG. 1). The agent 30 interacted with the customer to resolve the customer's issue. The agent made selections in the graphical user interface (shown as reference numeral 42 in FIG. 2) to dispose of the customer's inquiry. The communication center application 20 then creates the record 30 to describe the disposition of the customer's inquiry. The record 30 comprises the preformatted note 96. Once the record 30 is created, the communication center application communicates that record 30 from the client computer 22 to the computer server 24 via the communications network 26. The computer server 24 then stores the preformatted note 96 in a database 100. The database 100 may be local to the computer server 24, or the database 100 may be remotely accessed via the communications network 26.

Figure 5:
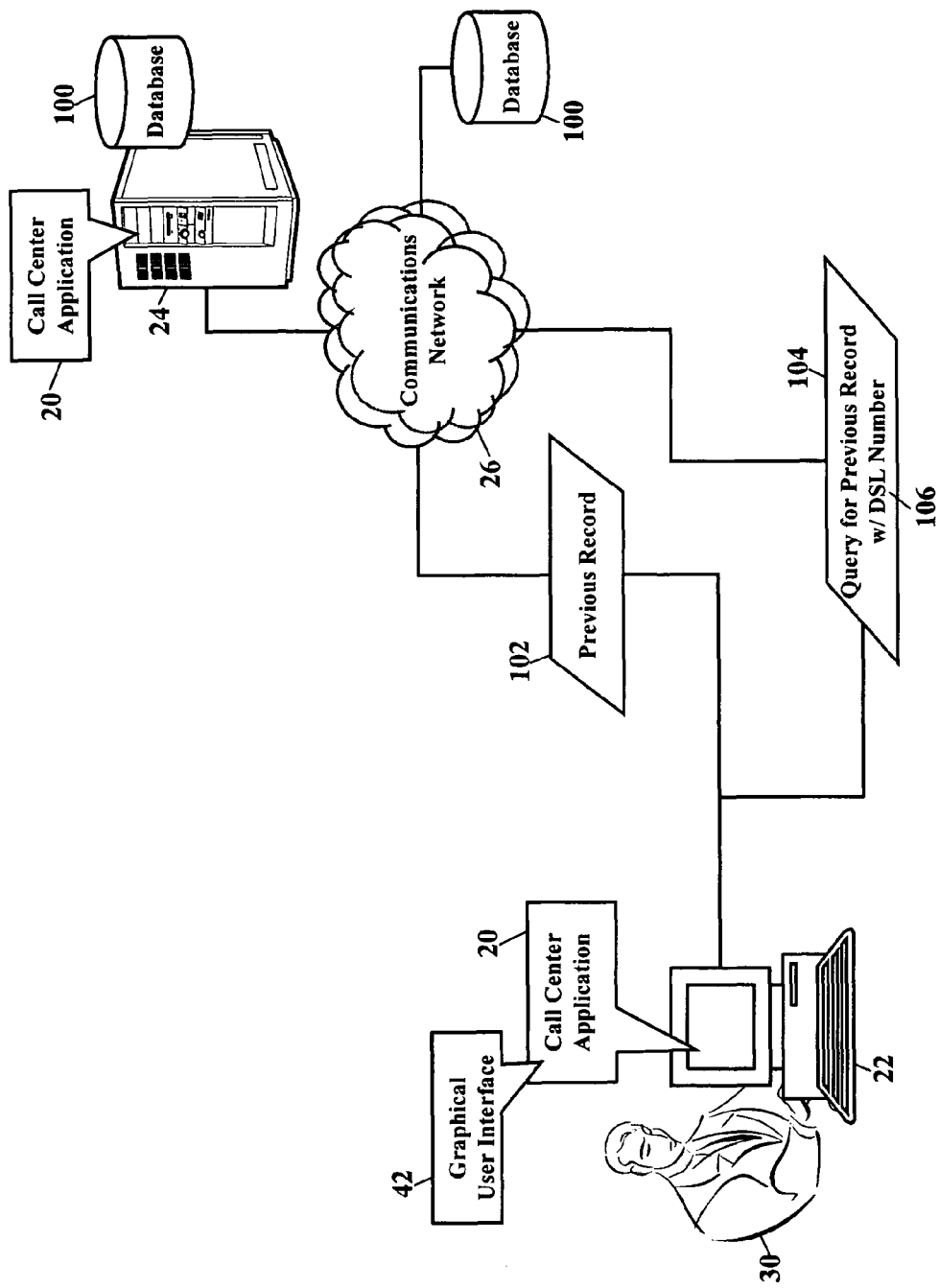
FIG. 5 is a schematic illustrating retrieval of a previous record, according to yet more exemplary embodiments.

FIG. 5 is a schematic illustrating retrieval of a previous record 102, according to yet more exemplary embodiments. The agent 30, as earlier explained, receives the request for support from the customer (shown as reference numeral 28 in FIG. 1). The communication center application 20 visually presents or produces the graphical user interface 42 at the client computer 22. The agent 30 first enters information that identifies the customer. The agent 30 can enter any information that may identify the customer. In this embodiment, for example, the agent 30 enters a DSL number in the DSL number data field (shown as reference numeral 44 in FIG. 2). The DSL number is a telephone number associated with the customer's digital subscriber line.

Once the agent 30 enters the DSL number, the communication center application 20 then performs a query. The communication center application 20 issues a query 104 for the previous record 102. The previous record 102 describes a previous request for support made by the same customer. The query 104 includes the information that identifies the customer. In this embodiment, then, the query 104 includes the DSL number 106. The query 104 communicates from the communication center application 20 to the database 100 via the communications network 26. The database 100 retrieves the previous record 102 based upon the information identifying the customer (e.g., the DSL number 106). The database 100 return communicates the previous record 102 to the communication center application 20. The previous record 102 communicates to the communication center application 20 operating at the client computer 22.

The communication center application 20 then pre-populates the menu of options (shown as reference numeral 50 in FIG. 2). Because the previous record 102 exists for the customer, the communication center application 20 can access known, stored information that describes the customer, the customer's computer equipment, and the customer's premise equipment. The communication center application 20 can retrieve this previous record 102 and pre-populate the data fields and options in the graphical user interface 42. Because the communication center application 20 can pre-populate the graphical user interface 42, the agent 30 need not waste time duplicating known information. The communication center application 20 can also quickly retrieve the previous record 102, thus allowing the agent 30 to more quickly resolve the customer's concern. The pre-populated information and selections are also less prone to erroneous entry by the agent.

Figure 6:
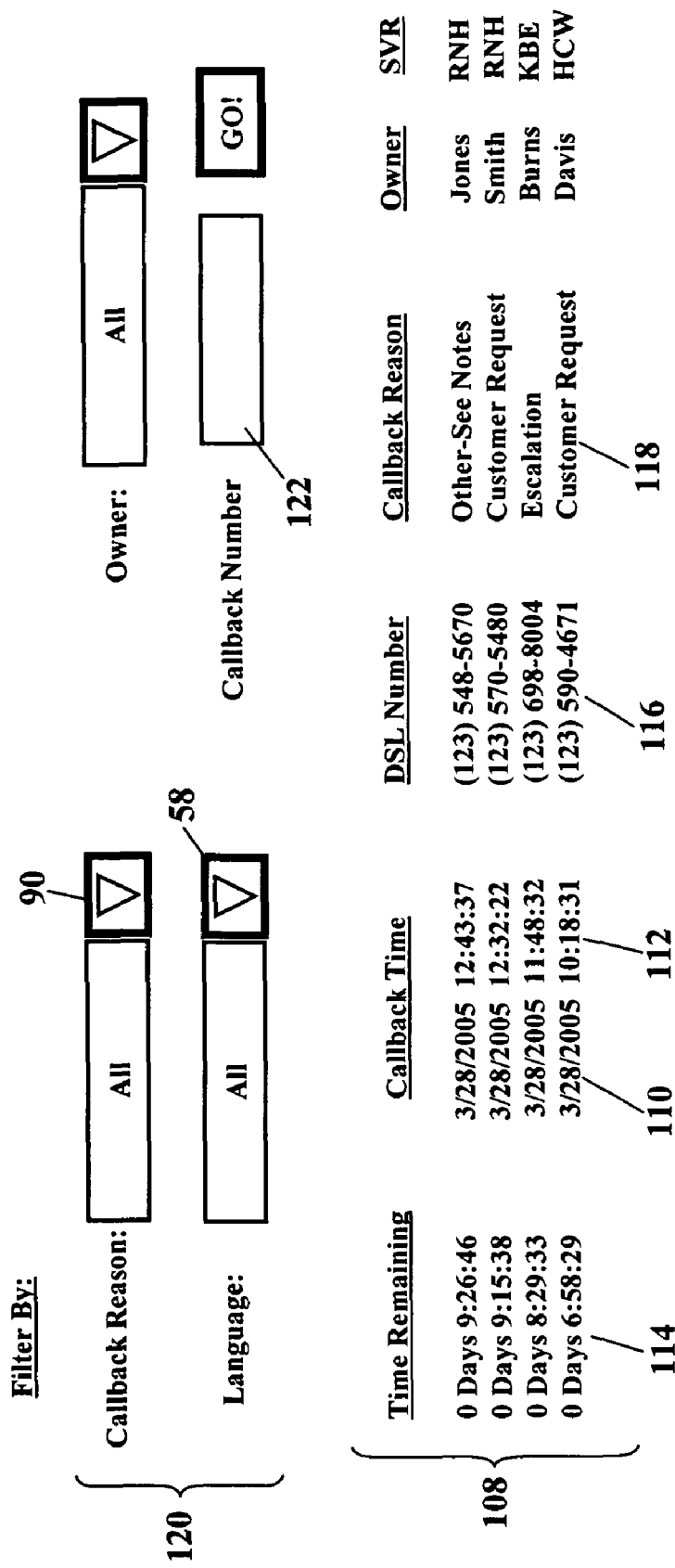
FIG. 6 is a schematic illustrating a commitment queue list, according to even more exemplary embodiments.

FIG. 6 is a schematic illustrating a commitment queue list 108, according to even more exemplary embodiments. The communication center application (shown as reference numeral 20 in FIGS. 1 and 3-5), as earlier described, allows the agent to schedule a callback follow-up with the customer. The communication center application allows the agent to schedule a date and time for the callback. The communication center application may even automatically schedule a callback based on problem codes, resolution codes, classes of customers, or even certain customers. Because these callbacks are scheduled, the communication center application may also track the callback commitments. This commitment queue list 108 can be made available to administrators and/or managers responsible for callbacks. The commitment queue list 108 can also be automatically distributed to specialized teams or groups responsible for keeping the commitments and contacting the customer.

The commitment queue list 108, then, presents a listing of all scheduled callbacks. As FIG. 6 shows, the commitment queue list 108 displays a scheduled date 110 and time 112 for the committed callback. The commitment queue list 108 also displays the time remaining 114 for the scheduled callback. Because the communication center application tracks the callback commitments, the communication center application can calculate the time remaining 114 for each commitment. Some state and/or federal authorities tightly regulate customer commitments. The communication center application, then, calculates the time remaining 114 for each commitment. Each customer's DSL number 116 is also listed, along with the reason 118 for the callback commitment. The commitment queue list 108 may even list the agent making the commitment, the person assigned to make the callback, and any supervisor or team leader information.

Figure 7:
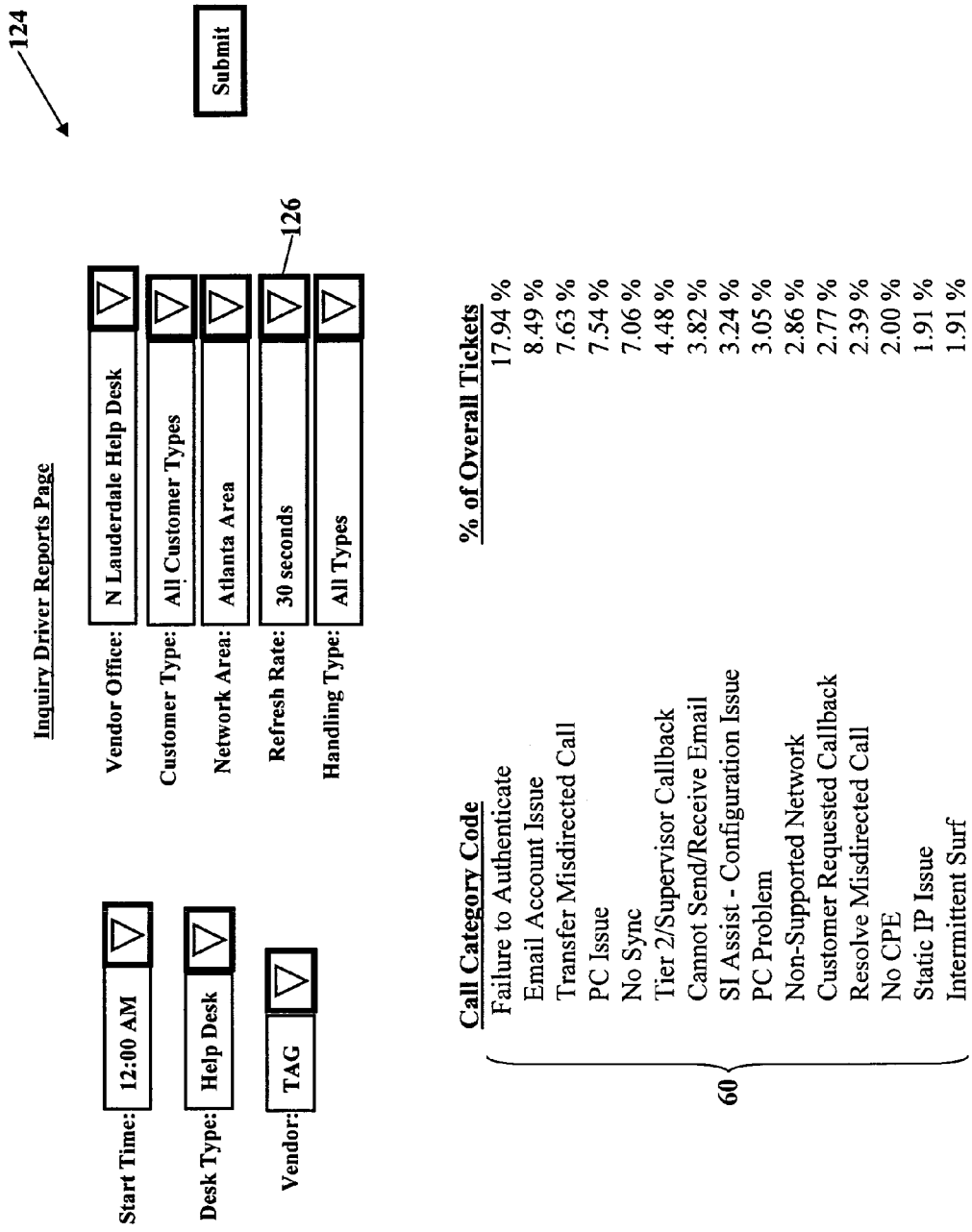
FIG. 7 is a schematic illustrating an inquiry driver reports page, according to still more exemplary embodiments.

The commitment queue list 108 can also be sorted. As FIG. 6 shows, the communication center application may permit an administrator or manager to sort/filter the commitment queue list 108. Filtering options 120, such as the reason 90 for scheduling the callback, the customer's preferred language 58, and the callback communications address or telephone number 122, are displayed. The commitment queue list 108, of course, could be alternatively sorted according to any data or scheme FIG. 7 is a schematic illustrating an inquiry driver reports page 124, according to still more exemplary embodiments. A call center might receive hundreds, if not thousands, of customer requests per hour or per day. The inquiry driver reports page 124 tracks why customers are requesting support. The communication center application (shown as reference numeral 20 in FIGS. 1 & 3-5) includes tracking features for determining what's driving the volume of customer inquiries. That is, the inquiry driver reports page 124 tabulates problem codes, resolution codes, or any other information or selection that might help administrators/managers to track problems. FIG. 7, for example, tracks the percentage of customer inquiries by problem code. The inquiry driver reports page 124 lists each problem code 60 and the percentage of inquiries having that problem code.

The inquiry driver reports page 124 also includes filtering options. The communication center application can filter the records in many ways to aid administrators and/or managers. If one hundred customer requests for support are received, the communication center application can display why those customers made an inquiry and how the agent disposed of that inquiry. The communication center application displays the percentage of those inquiries according to problem code, resolution code, or any other criterion. The communication center application can also filter these statistics according to a range of times and/or dates, according to vendors, regions, and many other criteria.

The inquiry driver reports page 124 also includes a configurable refresh rate 126. The communication center application can be configured to automatically refresh the inquiry driver reports page 124 according to the refresh rate 126. The refresh rate 126 is shown as occurring every thirty (30) seconds, but the refresh rate 126 can be any value. In this embodiment the inquiry driver reports page 124 refreshes itself every thirty (30) seconds. An administrator or manager would keep the inquiry driver reports page 124 open and running on their computer, thus tracking the inquiry volume in thirty second intervals. The configurable refresh rate 126 allows the administrator/manager to quickly see spikes and volume for different problem and/or resolution codes. The inquiry driver reports page 124, for example, can quickly indicate an e-mail problem, service outage, or some other problem that drives customer inquiries.

The communication center application may also produce a repeat report. This repeat report measures the amount of customers who repeat an inquiry within a given date range. Operators of call centers are always looking to reduce the amount of times customers have to repeat their inquiries for chronic problems. The repeat report, then, measures specifically customers who are repeating their request for support within a specific date range. The communication center application, again, may filter or sort the information according to problem code, vendor, location, resolution code, or any other criterion. The repeat report is especially useful for identifying when particular agents or entire call centers need additional coaching.

Figure 8:
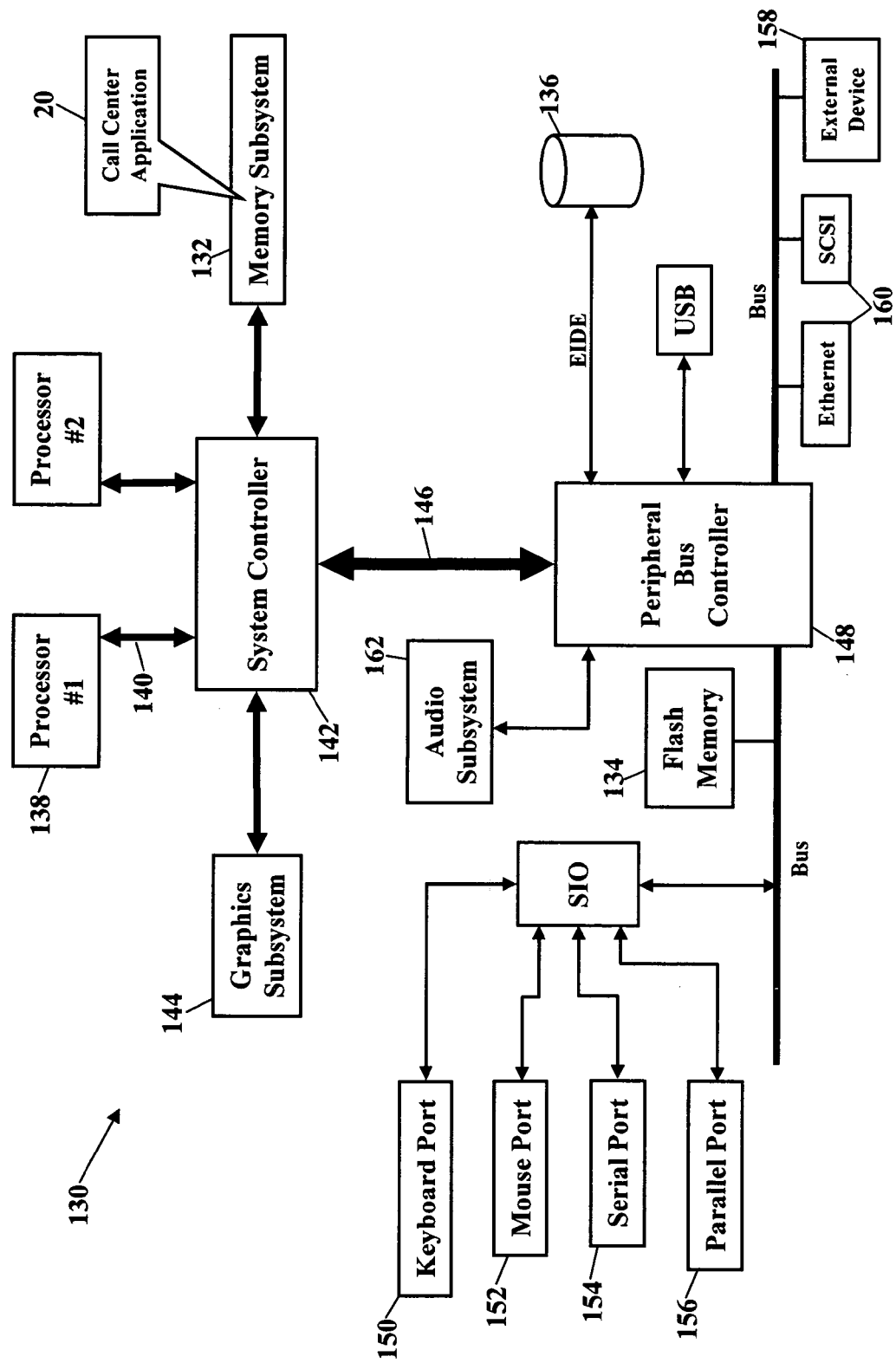
FIG. 8 depicts another possible operating environment for the exemplary embodiments.

FIG. 8 depicts another possible operating environment for the exemplary embodiments. FIG. 8 is a block diagram showing the communication center application 20 residing in a computer system 130 (such as the client computer 22 or the computer server 24 shown in FIG. 1). FIG. 8, however, may also represent any processor-controlled communications device, such as a personal digital assistant (PDA), a Global Positioning System (GPS) device, an interactive television, an Internet Protocol (IP) phone, a pager, a cellular/satellite phone, or any communications device utilizing a digital signal processor (DSP). FIG. 8 may also represent a block diagram of watches, radios, vehicle electronics, clocks, printers, gateways, and other apparatuses and systems utilizing processor control.

As FIG. 8 shows, the communication center application 20 operates within a system memory device. The communication center application 20, for example, is shown residing in a memory subsystem 132. The communication center application 20, however, could also reside in flash memory 134 or peripheral storage device 136. The computer system 130 also has one or more central processors 138 executing an operating system. The operating system, as is well known, has a set of instructions that control the internal functions of the computer system 130. A system bus 140 communicates signals, such as data signals, control signals, and address signals, between the central processor 138 and a system controller 142 (typically called a "Northbridge"). The system controller 142 provides a bridging function between the one or more central processors 138, a graphics subsystem 144, the memory subsystem 132, and a PCI (Peripheral Controller Interface) bus 146. The PCI bus 146 is controlled by a Peripheral Bus Controller 148. The Peripheral Bus Controller 148 (typically called a "Southbridge") is an integrated circuit that serves as an input/output hub for various peripheral ports. These peripheral ports could include, for example, a keyboard port 150, a mouse port 152, a serial port 154 and/or a parallel port 156 for a video display unit, one or more external device ports 158, and networking ports 160 (such as SCSI or Ethernet). The Peripheral Bus Controller 148 could also include an audio subsystem 162. Those of ordinary skill in the art understand that the program, processes, methods, and systems described herein are not limited to any particular computer system or computer hardware.

One example of the central processor 138 may be a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Those skilled in the art further understand that the program, processes, methods, and systems described herein are not limited to any particular manufacturer's central processor.

According to an exemplary embodiment, the WINDOWS® (WINDOWS® is a registered trademark of Microsoft Corporation, One Microsoft Way, Redmond Wash. 98052-6399, 425.882.8080, www.Microsoft.com) operating system may be used. Other operating systems, however, are also suitable. Such other operating systems would include the UNIX® operating system (UNIX® is a registered trademark of the Open Source Group, www.opensource.org), the UNIX-based Linux operating system, WINDOWS NT®, and Mac® OS (Mac® is a registered trademark of Apple Computer, Inc., 1 Infinite Loop, Cupertino, Calif. 95014, 408.996.1010, www.apple.com). Those of ordinary skill in the art again understand that the program, processes, methods, and systems described herein are not limited to any particular operating system.

The system memory device (shown as memory subsystem 132, flash memory 134, or peripheral storage device 136) may also contain an application program. The application program cooperates with the operating system and with a video display unit (via the serial port 154 and/or the parallel port 156) to provide a Graphical User Interface (GUI). The Graphical User Interface typically includes a combination of signals communicated along the keyboard port 150 and the mouse port 152. The Graphical User Interface provides a convenient visual and/or audible interface with a user of the computer system 130.

Figure 9:
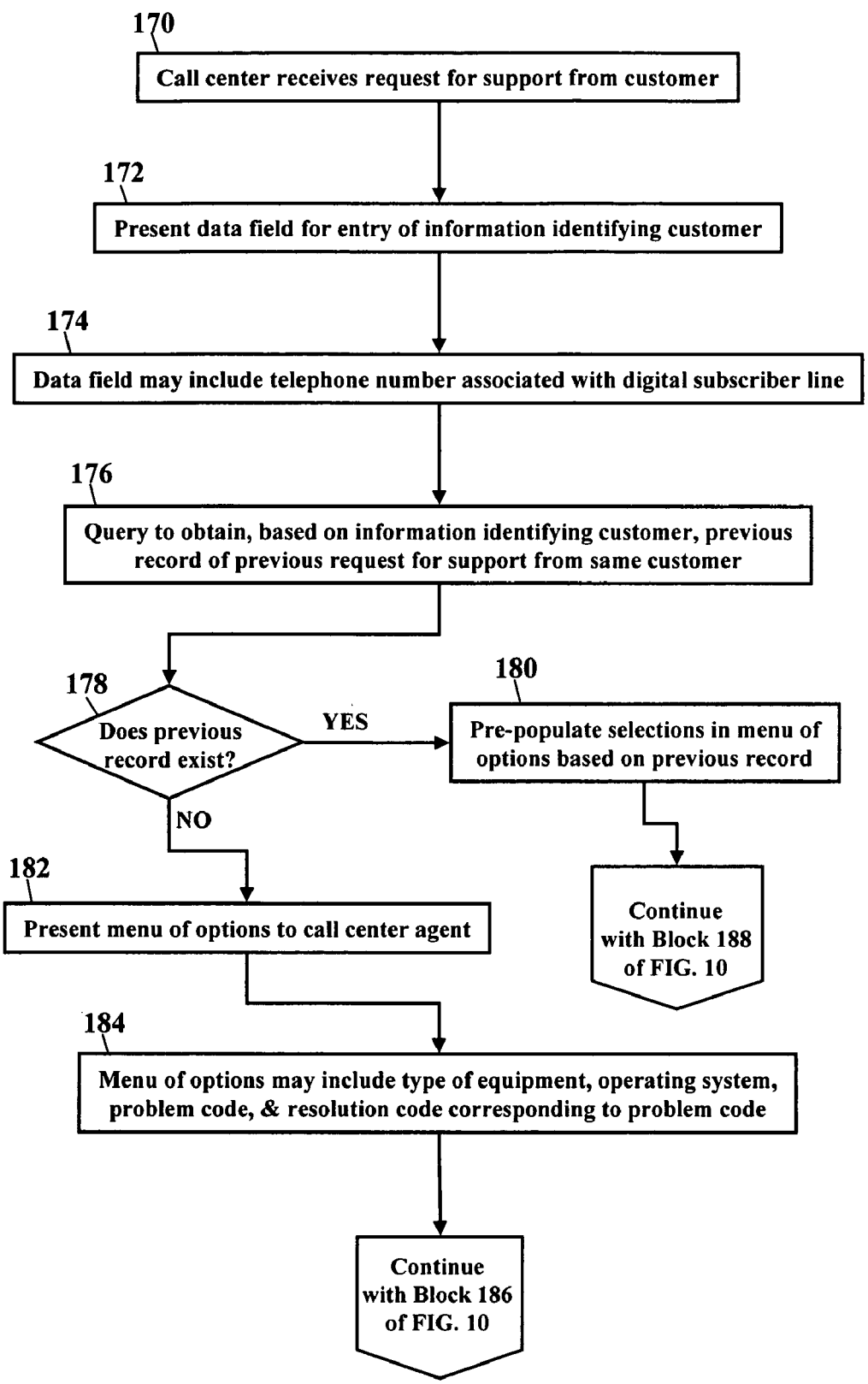
FIGS. 9 & 10 are flowcharts illustrating a method of creating a record of a disposition.

FIG. 9 is a flowchart illustrating a method of creating a record of a call disposition. A call center receives a request for support from a customer (Block 170). A data field is presented for entry of information identifying the customer (Block 172). The data field may include a telephone number data field for entry of a telephone number associated with a Digital Subscriber Line (Block 174). A query is made to obtain, based on the information identifying the customer, a previous record of a previous request for support from the same customer (Block 176). If a previous record exists (Block 178), the method pre-populates selections in a menu of options based on the previous record (Block 180). If, however, a previous record does not exist (Block 178), the menu of options is presented to a agent (Block 182). The menu of options allows the agent to make selections describing the customer's request for support. The menu of options may include a type of equipment used by the customer, an operating system used by the customer, a problem code describing the customer's problem, and a resolution code corresponding to the problem code (Block 184).

Figure 10:
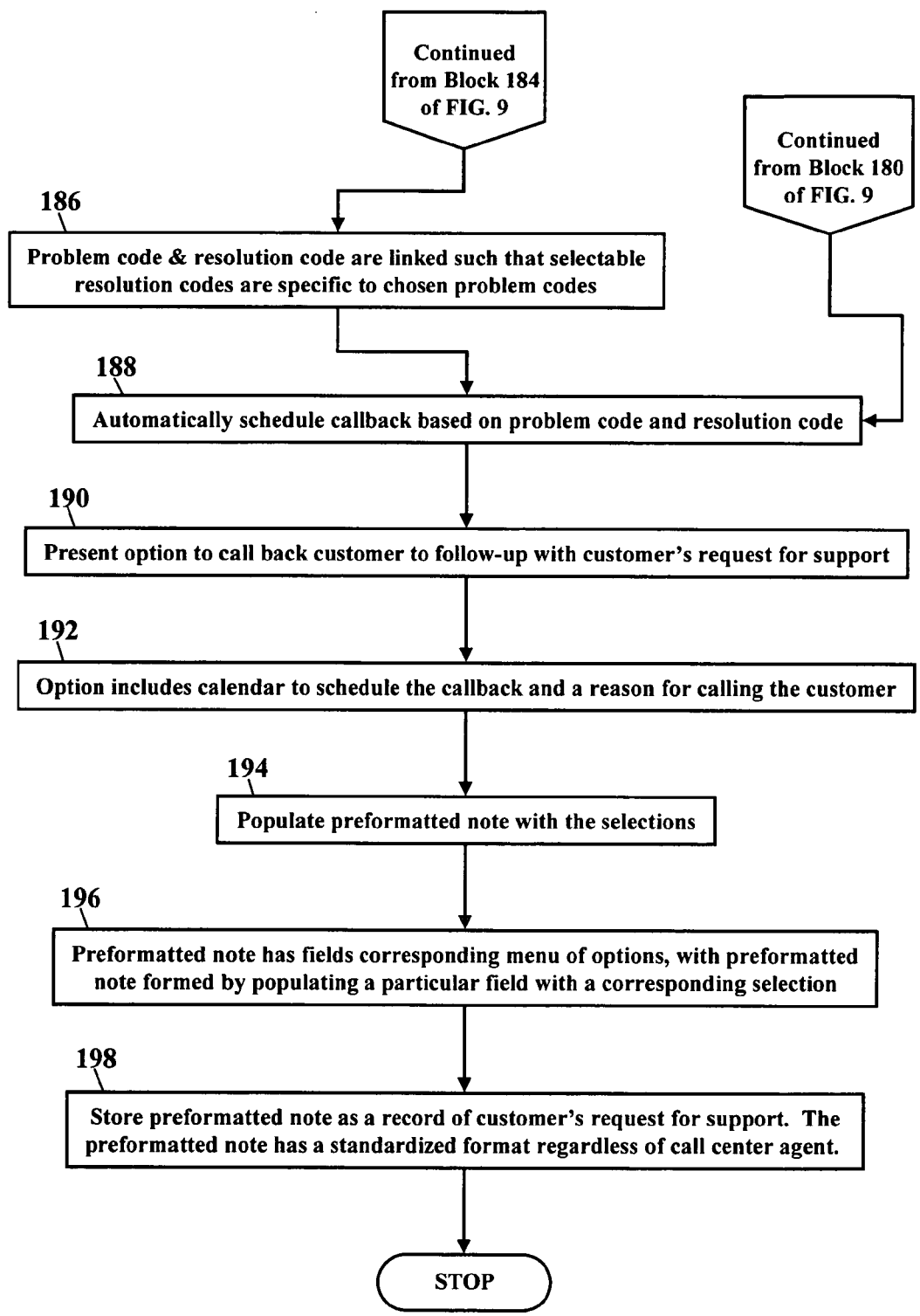

The flowchart continues with FIG. 10. The problem code and the resolution code are linked such that selectable resolution codes are specific to chosen problem codes (Block 186). A callback may be automatically scheduled based on the problem code and the resolution code (Block 188). An option may also be presented to call back the customer to follow-up with the customer's request for support (Block 190). The option includes a calendar to schedule the callback and a reason for calling the customer (Block 192). A preformatted note is populated with the selections (Block 194). The preformatted note has fields corresponding to the menu of options, with the preformatted note formed by populating a particular field with a corresponding selection by the agent (Block 196). The preformatted note is then stored as a record of the customer's request for support (Block 198). The preformatted note has a standardized format regardless of the agent.

The communication center application may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the exemplary embodiments, allow the communication center application to be easily disseminated. A computer program product comprises the communication center application stored on the computer-readable medium. The communication center software application comprises computer-readable instructions for creating a record of a call disposition. The communication center software application presents a data field for entry of information identifying a customer making a request for support to a call center. A menu of options is presented to a agent, and the menu of options allows the agent to make selections describing the customer's request for support. A preformatted note is populated with the selections received from the agent. The preformatted note has fields corresponding to the menu of options, with the preformatted note formed by populating a particular field with a corresponding selection by the agent. The preformatted note is stored as the record of the customer's request for support, wherein the preformatted note has a standardized format regardless of the agent.

The communication center application may be physically embodied on or in any addressable (e.g., HTTP, I.E.E.E. 802.11, Wireless Application Protocol (WAP)) wireless device capable of presenting an IP address. Examples could include a computer, a wireless personal digital assistant (PDA), an Internet Protocol mobile phone, or a wireless pager.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A method of creating a record of a communication disposition, comprising:
   receiving a request for support from a customer;
   presenting a data field for entry of information identifying the customer;
   presenting a menu of options that allow an agent to make selections describing the customer's request for support;
   populating a preformatted note with the selections received from the agent, the preformatted note having fields corresponding to the menu of options, with the preformatted note formed by populating a particular field with a corresponding selection by the agent;
   receiving notes from the agent describing the customer's request for support;
   including the notes in the preformatted note;
   periodically discarding a character from the notes unless the character is a space between two adjacent words such that each word in the notes is limited in character length; and
   storing the preformatted note as a record of the customer's request for support,
   wherein the preformatted note has a standardized format for all agents.

2. A method according to claim 1, further comprising querying, based upon the information identifying the customer, a previous record of a previous request for support.

3. A method according to claim 2, further comprising pre-populating the selections in the menu of options based on the previous record.

4. A method according to claim 1, further comprising presenting a telephone number data field for entry of a telephone number associated with a Digital Subscriber Line.

5. A method according to claim 1, further comprising receiving the agent's selection of a type of equipment used by the customer, an operating system used by the customer, a problem code describing the customer's problem, and a resolution code corresponding to the problem code, the problem code and the resolution code being linked such that selectable resolution codes are specific to chosen problem codes.

6. A method according to claim 5, further comprising automatically scheduling a callback to the customer based upon the problem code and the resolution code.

7. A method according to claim 1, further comprising presenting an option to call back the customer to follow-up with the customer's request for support, the option including a calendar to schedule the callback and a reason for calling the customer.

8. A system for creating a record of a call disposition, the system comprising:
   a processor executing code stored in memory that causes the processor to:

present a data field in a graphical user interface for entry of information identifying a customer making a request for support;

graphically present a menu of options to an agent that allows the agent to make selections describing the customer's request for support;

populate a preformatted note with the selections received from the agent, the preformatted note having fields corresponding to the menu of options, with the preformatted note formed by populating a text field with a corresponding selection by the agent;

receive notes from the agent describing the customer's request for support;

include the notes in the preformatted note;

limit a character length of each word in the notes by periodically discarding every nth ASCII character from the notes, where n represents an integer value, unless the nth ASCII character represents a space between two adjacent words, such that the space between the words is maintained so that each word in the notes is limited in character length; and store the preformatted note as the record of the customer's request for support, wherein the preformatted note has a standardized format regardless of the agent.

9. A system according to claim 8, wherein the code further causes the processor to query, based upon the information identifying the customer, a previous record of a previous request for support.

10. A system according to claim 9, wherein the code further causes the processor to pre-populate the selections in the menu of options based on the previous record.

11. A system according to claim 8, wherein the code further causes the processor to present the data field for entry of the information identifying the customer as a telephone number data field for entry of a telephone number associated with a Digital Subscriber Line.

12. A system according to claim 8, wherein the code further causes the processor to present the menu of options by allowing the agent to select a type of equipment used by the customer, an operating system used by the customer, a problem code describing the customer's problem, and a resolution code corresponding to the problem code, the problem code and the resolution code being linked such that selectable resolution codes are specific to chosen problem codes.

13. A system according to claim 12, wherein the code further causes the processor to automatically schedule a callback to the customer based upon the problem code and the resolution code.

14. A system according to claim 8, wherein the code further causes the processor to present an option to call back the customer to follow-up with the customer's request for support, the option including a calendar to schedule the callback and a reason for calling the customer.

15. A non-transitory computer-readable media storing processor executable instructions for performing a method, the method comprising:

presenting a data field in a graphical user interface for entry of information identifying a customer making a request for support to a communication center;

presenting a menu of options in the graphical user interface that allows an agent to make selections describing the customer's request for support;

populating a preformatted note with the selections received from the agent, the preformatted note having fields corresponding to the menu of options, with the preformatted note formed by populating a text field with a corresponding selection by the agent;

receiving notes from the agent describing the customer's request for support;

including the notes in the preformatted note;

limiting a character length of each word in the notes by periodically discarding every nth ASCII character from the notes, where n represents an integer value, unless the nth ASCII character represents a space between two adjacent words, such that the space between the words is maintained so that each word in the notes is limited in character length; and storing the preformatted note as the record of the customer's request for support, wherein the preformatted note has a standardized format regardless of the agent.

16. A computer-readable media according to claim 15, further comprising instructions for querying, based upon the information identifying the customer, a previous record of a previous request for support and pre-populating the selections in the menu of options based on the previous record.

17. A computer-readable media according to claim 15, further comprising instructions for presenting a telephone number data field to identify the customer, the telephone number data field for entry of a telephone number associated with a Digital Subscriber Line.

18. A computer-readable media according to claim 15, further comprising instructions for allowing the agent to select a type of equipment used by the customer, an operating system used by the customer, a problem code describing the customer's problem, and a resolution code corresponding to the problem code, the problem code and the resolution code being linked such that selectable resolution codes are specific to chosen problem codes.

19. A computer-readable media according to claim 18, further comprising instructions for automatically scheduling a callback to the customer based upon the problem code and the resolution code.

20. A computer-readable media according to claim 15, further comprising instructions for presenting an option to call back the customer to follow-up with the customer's request for support, the option including a calendar to schedule the callback and a reason for calling the customer.

* * * * *